United States Patent [19]
Dang et al.

[11] Patent Number: 5,600,703
[45] Date of Patent: Feb. 4, 1997

[54] METHOD AND APPARATUS FOR REMOTELY RETRIEVING MESSAGES INTENDED FOR AN ACKNOWLEDGE-BACK PAGER IN A SELECTIVE CALL COMMUNICATION SYSTEM

[75] Inventors: Tri T. Dang, Coconut Creek; Kwok K. Choi, Coral Springs; Lowell C. Hufferd III, Delray Beach, all of Fla.

[73] Assignee: Motorola, Inc., Schaumburg, Ill.

[21] Appl. No.: 393,797

[22] Filed: Feb. 24, 1995

[51] Int. Cl.$^6$ ........................................... H04Q 7/12
[52] U.S. Cl. .................. 379/57; 379/58; 340/825.44; 340/313
[58] Field of Search ................... 379/57, 58, 59, 379/63; 340/825.44, 311.1, 313; 455/33.1, 31.1, 32.1, 38.1, 39, 49.1, 73

[56] References Cited

U.S. PATENT DOCUMENTS

| | | |
|---|---|---|
| 4,868,560 | 9/1989 | Oliwa et al. |
| 4,875,038 | 10/1989 | Siwiak et al. |
| 4,882,579 | 11/1989 | Siwiak ........................... 340/825.44 |
| 4,928,096 | 5/1990 | Leonardo et al. ................. 340/825.44 |
| 5,396,537 | 3/1995 | Schwendeman ........................ 379/57 |
| 5,432,839 | 7/1995 | DeLuca .................................... 379/57 |
| 5,444,438 | 8/1995 | Goldberg ........................... 340/825.44 |
| 5,463,382 | 10/1995 | Nikas et al. ....................... 340/825.44 |

Primary Examiner—Curtis Kuntz
Assistant Examiner—Michael B. Chernoff
Attorney, Agent, or Firm—R. Louis Breeden

[57] ABSTRACT

A method and apparatus remotely retrieves messages intended for an acknowledge-back pager (400, 700) in a communication system including a fixed portion (100) and the pager (400, 700). The communication system has provisions for interconnection with a user by telephone. The fixed portion (100) accepts (502) a selective call origination from a caller, including a message intended for the pager (400, 700) and sends (504) the message to the pager (400, 700) in response. The pager (400, 700) stores (506) the message within a pager memory (418). Thereafter the fixed portion (100) accepts (508) a selective call origination from the user, including a predetermined retrieval code associated with the pager (400, 700). The fixed portion (100) sends (510) a predetermined retrieval command to the pager (400, 700) in response, and the pager (400, 700) retrieves the message from the pager memory (418) in response. The pager (400, 700) transmits (512) the message retrieved to the fixed portion (100), which then stores (514) the message within a controller memory (232, 602) and sends (514) the message by telephone to the user.

22 Claims, 7 Drawing Sheets

METHOD AND APPARATUS FOR REMOTELY RETRIEVING MESSAGES INTENDED FOR AN ACKNOWLEDGE-BACK PAGER IN A SELECTIVE CALL COMMUNICATION SYSTEM

FIELD OF THE INVENTION

This invention relates in general to selective call communication systems, and more specifically to a method and apparatus for remotely retrieving messages intended for an acknowledge-back pager in a selective call communication system.

BACKGROUND OF THE INVENTION

Conventional selective call communication systems have employed acknowledge-back pagers to obtain verification of the receipt of sent pages. The acknowledge-back pager has included a low-power transmitter for returning an acknowledgment message in response to a received page intended for, i.e., matching the address of, the pager. The low-power transmitter can also be used for sending messages other than acknowledgment messages. Such "unscheduled" messages can be utilized, for example, to register a traveler's new location or to request delivery of some specific information.

If a pager user of the conventional selective call communication system does not carry the pager along when traveling to another location, messages sent to the pager will be stored in the pager (if turned on) to the maximum extent of the memory of the pager. Unfortunately, the pager user will be unaware of the messages until returning to the location of the pager, at which time some of the messages may have become too old to be of much value. In addition, if the memory of the pager has become filled to capacity at some point in time, all messages received thereafter may have become irretrievably lost.

Thus, what is needed is a method and apparatus for remotely retrieving messages intended for a pager, so that a remote pager user can maintain currency of message reception and further can prevent lost messages due to a full pager memory.

SUMMARY OF THE INVENTION

An aspect of the present invention is a method for remotely retrieving messages intended for an acknowledge-back pager in a selective call communication system including a fixed portion and a portable portion comprising the acknowledge-back pager. The selective call communication system has provisions for interconnection with a user through a telephone system. The method comprises the steps of accepting by the fixed portion a selective call origination from a caller, comprising a message intended for the acknowledge-back pager, and sending the message from the fixed portion to the acknowledge-back pager in response. The method further comprises the steps of storing the message sent in the sending step within a pager memory of the acknowledge-back pager, and thereafter accepting by the fixed portion a selective call origination from the user, the selective call origination comprising a predetermined retrieval code associated with the acknowledge-back pager. The method also includes the steps of sending a predetermined retrieval command to the acknowledge-back pager in response to the predetermined retrieval code, and retrieving the message from the pager memory in response to the predetermined retrieval command. In addition, the method includes the steps of transmitting the message retrieved, from the acknowledge-back pager to the fixed portion; and storing the message transmitted in the transmitting step within a controller memory of the fixed portion. The method further comprises the step of thereafter sending the message from the controller memory through the telephone system to the user.

Another aspect of the present invention is a method for remotely retrieving messages intended for an acknowledge-back pager in a selective call communication system including a fixed portion and a portable portion comprising the acknowledge-back pager. The selective call communication system has provisions for interconnection with a user through a telephone system. The method comprises the steps of accepting by the fixed portion a selective call origination from a caller, comprising a message intended for the acknowledge-back pager; and sending the message and a corresponding message identifier from the fixed portion to the acknowledge-back pager in response. The method further comprises the steps of storing the message and the message identifier sent in the sending step within a pager memory of the acknowledge-back pager and within a controller memory of the fixed portion, and thereafter accepting by the fixed portion a selective call origination from the user, the selective call origination comprising a predetermined retrieval code associated with the acknowledge-back pager. The method further comprises the steps of sending a predetermined retrieval command to the acknowledge-back pager in response to the predetermined retrieval code, and retrieving the message identifier from the pager memory in response to the predetermined retrieval command. The method also includes the steps of transmitting the message identifier retrieved, from the acknowledge-back pager to the fixed portion; and accessing the controller memory to locate the message by matching the message identifier transmitted in the transmitting step with the message identifier stored in the controller memory. In addition, the method includes the step of thereafter sending the message from the controller memory through the telephone system to the user.

Another aspect of the present invention is a controller for providing remote retrieval of messages intended for an acknowledge-back pager in a selective call communication system including a fixed portion comprising the controller and a transmitter, and a portable portion comprising the acknowledge-back pager. The controller has provisions for interconnection with a user through a telephone system. The controller comprises a telephone interface coupled to a telephone system for accepting a selective call origination from a caller, comprising a message intended for the acknowledge-back pager; and a processor coupled to the telephone interface for processing the selective call origination. The controller further comprises a transmitter interface coupled to the processor for controlling the transmitter to send the message to the acknowledge-back pager for storage in a pager memory therein; and a retrieval command sender coupled to the processor for controlling the transmitter to send a predetermined retrieval command to the acknowledge-back pager in response to accepting a selective call origination from the user, the selective call origination comprising a predetermined retrieval code associated with the acknowledge-back pager. The controller also includes a receiver coupled to the processor for receiving a transmission of the message, the message retrieved from the pager memory in response to the predetermined retrieval command; and a controller memory for storing the message received from the pager memory. In addition, the controller includes a message delivery element coupled to the processor for transmitting the message from the controller through the telephone system to the user.

Another aspect of the present invention is a controller for providing remote retrieval of messages intended for an acknowledge-back pager in a selective call communication system including a fixed portion comprising the controller and a transmitter, and a portable portion comprising the acknowledge-back pager. The controller has provisions for interconnection with a user through a telephone system. The controller comprises a telephone interface coupled to a telephone system for accepting a selective call origination from a caller, comprising a message intended for the acknowledge-back pager; and a processor coupled to the telephone interface for processing the selective call origination and for storing the message and a corresponding message identifier in a controller memory. The controller further comprises the controller memory coupled to the processor for storing the message and the message identifier, and a transmitter interface coupled to the processor for controlling the transmitter to send the message and the message identifier to the acknowledge-back pager for storage in a pager memory therein. The controller also includes a retrieval command sender coupled to the processor for controlling the transmitter to send a predetermined retrieval command to the acknowledge-back pager in response to accepting a selective call origination from the user, the selective call origination comprising a predetermined retrieval code associated with the acknowledge-back pager; and a receiver coupled to the processor for receiving a transmission of the message identifier, the message identifier retrieved from the pager memory in response to the predetermined retrieval command. In addition, the controller includes a message locator for accessing the controller memory to locate the message by matching the message identifier received by the receiver with the message identifier stored in the controller memory, and a message delivery element coupled to the processor for sending the message from the controller memory through the telephone system to the user.

Another aspect of the present invention is an acknowledge-back pager for providing remote retrieval of messages intended for the acknowledge-back pager in a selective call communication system including a fixed portion and a portable portion comprising the acknowledge-back pager. The selective call communication system has provisions for interconnection with a user through a telephone system. The acknowledge-back pager comprises a receiver communicating by radio with the fixed portion for receiving a message therefrom in response to a selective call origination from a caller, comprising the message intended for the acknowledge-back pager; and a pager memory coupled to the receiver for storing the message in the acknowledge-back pager. The acknowledge-back pager further comprises a microprocessor coupled to the receiver and coupled to the pager memory for controlling the acknowledge-back pager, and user controls coupled to the microprocessor for providing operational control by a user of the acknowledge-back pager. The acknowledge-back pager also includes a retrieval command detector coupled to the microprocessor for detecting a predetermined retrieval command sent from the fixed portion in response to accepting a selective call origination from the user, the selective call origination comprising a predetermined retrieval code associated with the acknowledge-back pager; and a message retriever coupled to the microprocessor for retrieving the message from the pager memory in response to the predetermined retrieval command. In addition, the acknowledge-back pager includes a transmitter coupled to the message retriever for transmitting the message retrieved, from the acknowledge-back pager to the fixed portion, in further response to the predetermined retrieval command.

Another aspect of the present invention is an acknowledge-back pager for providing remote retrieval of messages intended for the acknowledge-back pager in a selective call communication system including a fixed portion and a portable portion comprising the acknowledge-back pager. The selective call communication system has provisions for interconnection with a user through a telephone system. The acknowledge-back pager comprises a receiver communicating by radio with the fixed portion for receiving a message and a corresponding message identifier therefrom in response to a selective call origination from a caller, comprising the message intended for the acknowledge-back pager; and a pager memory coupled to the receiver for storing the message and the message identifier in the acknowledge-back pager. The acknowledge-back pager further comprises a microprocessor coupled to the receiver and coupled to the pager memory for controlling the acknowledge-back pager, and user controls coupled to the microprocessor for providing operational control by a user of the acknowledge-back pager. The acknowledge-back pager also includes a retrieval command detector coupled to the microprocessor for detecting a predetermined retrieval command sent from the fixed portion in response to accepting a selective call origination from the user, the selective call origination comprising a predetermined retrieval code associated with the acknowledge-back pager; and a message identifier retriever coupled to the microprocessor for retrieving the message identifier from the pager memory in response to the predetermined retrieval command. In addition, the acknowledge-back pager includes a transmitter coupled to the message identifier retriever for transmitting the message identifier retrieved, from the acknowledge-back pager to the fixed portion, in further response to the predetermined retrieval command.

DETAILED DESCRIPTION OF THE DRAWINGS

Briefly, the embodiments described below in accordance with the present invention provide a method and apparatus for a user of an acknowledge-back pager to access messages intended for the pager even though the user is separated from the pager. Preferably, the user who has become separated from the pager can access a fixed portion of the system by telephone in a manner similar to sending a page to the pager, and can then input a special, predetermined retrieval code to initiate a retrieval process to retrieve unread (or, alternatively, all) messages stored in the pager. While the retrieval process is activated, future pages are stored in the fixed portion and can also be retrieved by telephone.

Figure 1:
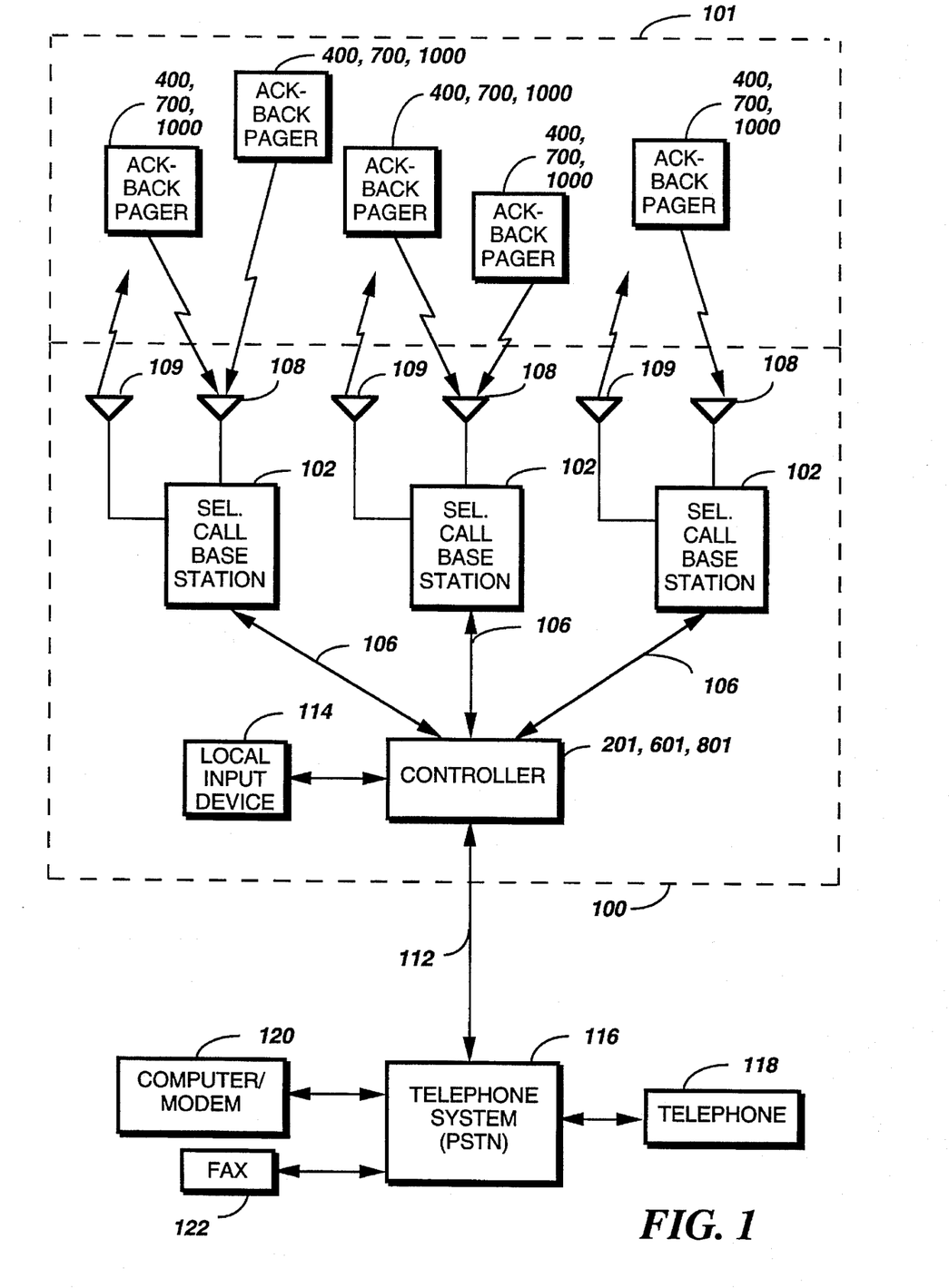
FIG. 1 is an electrical block diagram of a selective call communication system in accordance with first, second, and third embodiments of the present invention.

With reference to FIG. 1, an electrical block diagram of a selective call communication system in accordance with first, second, and third embodiments of the present invention comprises the fixed portion 100 and a portable portion 101. The fixed portion 100 comprises a plurality of conventional selective call base stations 102 coupled by communication links 106 to a controller 201, 601, 801 for controlling the selective call base stations 102. The controller 201 is intended for retrieving numeric and alphanumeric messages in accordance with the first embodiment. The controller 601 is intended for retrieving voice messages in accordance with the second embodiment. The controller 801 is intended for retrieving numeric and alphanumeric messages in accordance with the third embodiment. It will be appreciated by one of ordinary skill in the art that aspects of the first and second embodiments can be combined for retrieving both voice and numeric/alphanumeric messages from a single controller.

The hardware of the controller 201, 601, 801 is preferably similar to the MPS 2000™ paging control center manufactured by Motorola, Inc. of Schaumburg, Ill. Other similar controller hardware can be utilized as well for the controller 201, 601, 801. The controller 201, 601, 801 comprises a plurality of firmware elements in accordance with the preferred embodiment of the present invention, as will be described further below.

Each of the selective call base stations 102 transmits radio signals to the portable portion 101 comprising a plurality of acknowledge-back pagers 400, 700, 1000 via a transmitting antenna 109. The acknowledge-back pager 400 is intended for retrieving numeric and alphanumeric messages in accordance with the first embodiment. The acknowledge-back pager 700 is intended for retrieving voice messages in accordance with the second embodiment. The acknowledge-back pager 1000 is intended for retrieving numeric and alphanumeric messages in accordance with the third embodiment. It will be appreciated by one of ordinary skill in the art that aspects of the first and second embodiments can be combined for retrieving both voice and numeric/alphanumeric messages from a single acknowledge-back pager. It will be further appreciated that other types of messages, e.g., facsimile images, can be retrieved as well in accordance with the present invention if the user has an appropriate terminal device for receiving the retrieved messages. The selective call base stations 102 each receive radio signals from the plurality of acknowledge-back pagers 400, 700, 1000 via a receiving antenna 108. The radio signals comprise selective call addresses and messages transmitted to the acknowledge-back pagers 400, 700, 1000 and acknowledgments received from the acknowledge-back pagers 400, 700, 1000. In accordance with the preferred embodiment of the present invention, the acknowledge-back pagers 400, 700, 1000 can also return earlier received and stored messages (or, alternatively, message identifiers) to the controller 201, 601, 801, as described herein below. The controller 201, 601, 801 preferably is coupled to a local input device 114, e.g., a conventional keyboard/display terminal, for accepting selective call originations therefrom and is coupled by conventional telephonic links 112 to a telephone system 116, e.g., the public switched telephone network (PSTN), for receiving selective call originations therefrom. Selective call originations from the telephone system 116 can be generated, for example, from a conventional telephone 118, a conventional computer/modem 120, or a conventional facsimile machine 122 coupled to the telephone system 116 in a manner that is well known in the art.

Transmissions between the selective call base stations 102 and the acknowledge-back pagers 400, 700, 1000 preferably utilize a well-known selective calling signaling protocol, such as the Motorola FLEX™ protocol. It will be appreciated that other protocols such as the Golay Sequential Code (GSC) or Post Office Code Standardization Advisory Group (POCSAG) protocol can be utilized as well. These protocols utilize well-known error detection and error correction techniques and are therefore tolerant to bit errors occurring during transmission, provided that the bit errors are not too numerous in any one code word. FLEX™, for example, utilizes a 32/21 Bose-Chadhuri-Hocquenghem (BCH) code word comprising 21 information bits and 11 parity bits. This code word can be processed in a well-known manner to correct up to two bit errors occurring within the code word, and to determine whether there are too many bit errors in the code word for the error correction algorithm to correct, thereby leaving uncorrectable errors in the code word.

Forward channel transmissions from the selective call base stations 102 preferably utilize four-level frequency shift keyed (FSK) modulation, operating at sixteen-hundred or thirty-two-hundred symbols-per-second (sps), depending on traffic requirements and required signaling reliability. Reverse channel transmissions from the acknowledge-back pagers 400, 700, 1000 to the selective call base stations 102 preferably utilize binary FSK modulation at a rate of eight-hundred bits per second (bps). Reverse channel transmissions preferably occur during predetermined data packet time slots synchronized with the forward channel transmissions. It will be appreciated that, alternatively, other signaling protocols, modulation schemes, and transmission rates can be utilized as well for either or both transmission directions. The forward and reverse channels preferably operate on a single carrier frequency utilizing well-known time division multiplex (TDM) techniques for sharing the frequency. It will be appreciated that, alternatively, the forward and reverse channels can operate on two different carrier frequencies without requiring the use of TDM techniques.

U.S. Pat. No. 4,875,038 to Siwiak et al., which describes an acknowledge-back selective call communication system, is hereby incorporated herein by reference. For further information on the operation and structure of the acknowledge-back selective call communication system, please refer to the Siwiak et al. patent.

Figure 2:
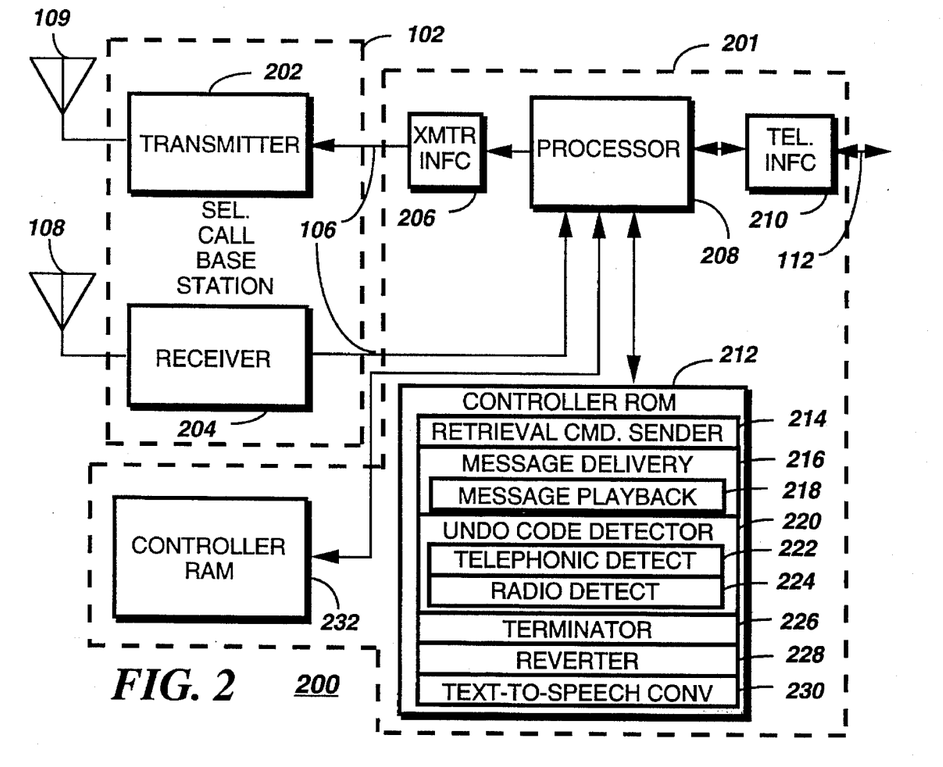
FIG. 2 is an electrical block diagram of portions of a controller and a selective call base station in accordance with the first embodiment of the present invention.

FIG. 2 is an electrical block diagram of portions 200 of the controller 201 and the selective call base station 102 in accordance with the first embodiment of the present invention. The first embodiment is intended for use in numeric and alphanumeric paging systems. The controller 201 comprises a processor 208 for directing operation of the controller 201. The processor 208 preferably is coupled through a conventional transmitter interface 206 to a conventional four-level FSK transmitter 202 of the selective call base station 102 for transmitting a radio signal comprising a message to the portable portion 101, i.e., to one of the acknowledge-back pagers 400 in accordance with the first embodiment. The processor 208 is also coupled to at least one conventional binary FSK receiver 204 for receiving an acknowledgment signal transmitted from the one of the acknowledge-back pagers 400 in response to receiving the message. The at least one receiver 204 can be collocated with the selective call base station 102, as implied in FIG. 2, but preferably is positioned remote from the selective call base station 102 to avoid interference from the transmitter 202. The at least one receiver 204 is also for receiving one or more messages (or, alternatively, one or more message identifiers) from the one of the acknowledge-back pagers 400 in response to a predetermined retrieval command sent to the one of the acknowledge-back pagers 400 in accordance with the embodiments of the present invention, as described in greater detail herein below.

The processor 208 also is preferably coupled to the telephonic links 112 and thence to the telephone system 116 by a telephone interface 210 for receiving therefrom a selective call origination comprising a message intended for the acknowledge-back pager 400. In addition, the processor 208 is coupled to a controller random access memory (RAM) 232 for storing one or more messages. The processor 208 also is coupled to a controller read-only memory (ROM) 212 comprising firmware elements for use by the processor 208. It will be appreciated that other types of memory, e.g., electrically erasable ROM (EEROM) or magnetic disk memory, can be utilized as well for the controller ROM 212. It will be further appreciated that the controller RAM 232 and the controller ROM 212, singly or in combination, can be integrated as a contiguous portion of the processor 208.

The firmware elements of the controller ROM 212 comprise a retrieval command sender 214 for controlling the transmitter 202 to send the predetermined retrieval command to the acknowledge-back pager 400 in response to accepting a selective call origination from the user, the selective call origination comprising the predetermined retrieval code associated with the acknowledge-back pager 400.

The firmware elements of the controller ROM 212 further comprise a message delivery element 216 for transmitting the message from the controller 201 through the telephone system 116 to the user after the message is received from the acknowledge-back pager 400 in response to the predetermined retrieval command. Preferably, the message delivery element 216 utilizes a conventional text-to-speech-converter 230, such as those readily available off-the-shelf for a personal computer, for converting a stored numeric or alphanumeric message into speech, which is then transmitted audibly to the user. It will be appreciated that, alternatively, the alphanumeric message can be transmitted without conversion if the user is calling from the computer/modem 120. It will be further appreciated that other types of messages, e.g., facsimile images, may be transmitted if the user is calling from a terminal compatible with the other types of messages.

The controller RAM 232 comprises a message storage location 304 (FIG. 3) for storing the message received from the acknowledge-back pager 400. In addition, the controller RAM 232 comprises additional message storage locations 306 (FIG. 3) for storing additional messages intended for the acknowledge-back pager 400, in response to the controller 201 having received the predetermined retrieval code without having later received a predetermined undo code intended for the acknowledge-back pager 400, and further in response to accepting additional selective call originations comprising the additional messages intended for the acknowledge-back pager 400.

The message delivery element 216 comprises a message playback element 218 for sending the additional messages from the controller RAM 232 to the user in response to accepting another selective call origination from the user, comprising a predetermined playback code intended for the acknowledge-back pager 400.

The firmware elements of the controller ROM 212 also include an undo code detector 220 for detecting a reception of the predetermined undo code intended for the acknowledge-back pager after having received the predetermined retrieval code. The undo code detector 220 includes a telephonic detection element 222 for detecting the undo code when sent from the telephone system 116 as a selective call origination. The undo code detector 220 also includes a radio detection element 224 for detecting the undo code when sent from one of the acknowledge-back pagers 400 in response to a predetermined user control sequence.

The firmware elements of the controller ROM 212 further comprise a terminator 226 for terminating storage of the additional messages in the controller RAM 232, in response to the undo code detector detecting a reception of the predetermined undo code. In addition, the firmware elements include a reverter 228 for sending future messages to the acknowledge-back pager for storage therein in response to the undo code detector detecting the reception of the predetermined undo code.

Figure 3:
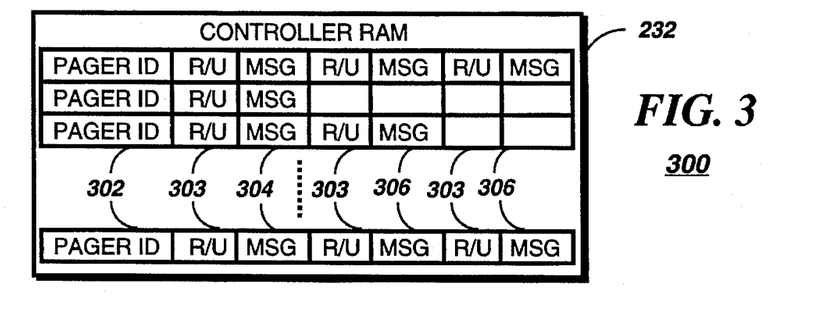
FIG. 3 is a memory utilization diagram of a controller random access memory (RAM) in accordance with the first embodiment of the present invention.

With reference to FIG. 3, a memory utilization diagram 300 of the controller RAM 232 in accordance with the first embodiment of the present invention depicts a plurality of pager identifiers (ID) 302, e.g., selective call addresses, each pager ID 302 for identifying one of the acknowledge-back pagers 400 having stored therefor at least one message. The message is stored in the message storage location 304. Additional messages are stored in the additional message storage locations 306. Also included in the controller RAM 232 is a read/unread flag 303 corresponding to each message storage location 304, 306 for indicating whether or not the user has read (or played back) the message stored therein. Preferably, the messages associated with each of the pager IDs 302 are stored as a conventional linked list, so that a variable number of messages can be stored as required for each of the acknowledge-back pagers 400, limited by the total capacity of the controller RAM 232.

Figure 4:
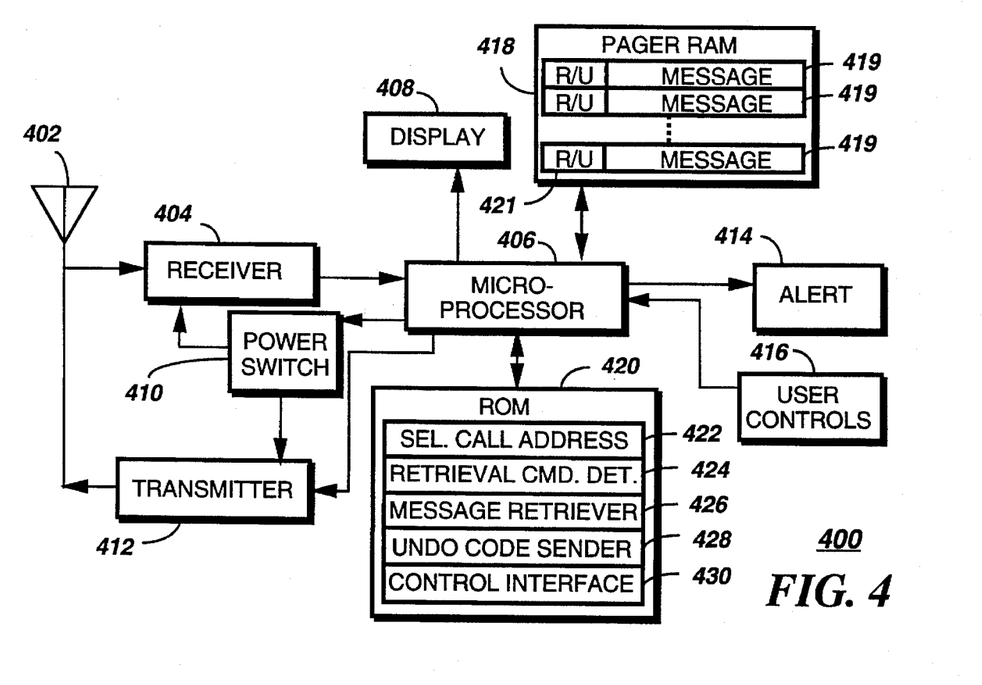
FIG. 4 is an electrical block diagram of an acknowledge-back pager of the selective call communication system in accordance with the first embodiment of the present invention.

With reference to FIG. 4, an electrical block diagram of the acknowledge-back pager 400 of the selective call communication system in accordance with the first embodiment of the present invention includes an antenna 402 for intercepting the transmitted radio signals, which are coupled to the input of a conventional four-level FSK receiver 404. The radio signals are preferably selective call (paging) signals which provide, for example, a receiver address and an associated message, such as numeric or alphanumeric message. However, it will be appreciated that, alternatively, other well known paging signaling formats, such as tone and voice signaling, are suitable for use as well.

The receiver 404 processes the radio signals and produces at the output a data stream representative of demodulated data information. The demodulated data information is coupled into the input of a microprocessor 406, which processes the information in a manner well known in the art. A transmitter 412 is coupled to the antenna 402 and to the microprocessor 406 for sending an acknowledgment signal in response to receiving a message or a command intended for the acknowledge-back pager 400. The transmitter 412 is preferably a conventional binary FSK transmitter operating at a symbol rate of eight-hundred bps. It will be appreciated that other modulation techniques and symbol rates can be used as well for the transmitter 412.

A conventional power switch 410, coupled to the microprocessor 406, is used to control the supply of power to the receiver 404, thereby providing a battery saving function, and to the transmitter 412 for controlling power thereto. When a selective call address is received by the microprocessor 406, the received address is compared with one or more selective call addresses 422 stored in a ROM 420, and when a match is detected, a call alerting signal is generated to alert a user that a selective call message, or page, has been received. It will be appreciated that other types of memory, e.g., electrically erasable ROM (EEROM), can be utilized as well for the ROM 420. The call alerting signal is directed to a conventional audible or tactile alerting device 414 for generating an audible or tactile call alerting signal. Conventional user controls 416 allow a user of the acknowledge-back pager 400 to, among other things, select between the audible call alerting signal and the tactile call alerting signal in a manner well known in the art.

The message which is subsequently received is stored in a message location 419 of a pager random access memory (RAM) 418, and can be accessed by the user for display using the user controls 416, which provide such additional functions as reset, read, delete, etc. Specifically, by the use of appropriate functions provided by the user controls 416, the message is recovered from the pager RAM 418 and processed by the microprocessor 406 for displaying by a conventional display 408, such as a liquid crystal display (LCD), which enables the user to view the message. Also included in the pager RAM 418 is a read/unread flag 421 corresponding to each message location 419 for indicating whether or not the user has displayed, and thus presumably has read, the message stored therein.

The receipt of the message by the acknowledge-back pager 400 can automatically generate an acknowledgment response to the selective call base station 102. The acknowledgment response preferably is transmitted at a time synchronized with the radio signals received from the selective call base station 102 that originated the message, by techniques well known to one of ordinary skill in the art. In addition, one or more of the messages received and stored in the pager RAM 418 can be retransmitted to the fixed portion 100 in response to a predetermined retrieval command in accordance with the first embodiment of the present invention, as explained below.

The microprocessor 406 preferably is implemented utilizing a microcomputer similar to the MC68HC05 series microcomputer, manufactured by Motorola, Inc. of Schaumburg, Ill. It will be appreciated that other similar microcomputers can be used as well for the microprocessor 406, and that the pager RAM 418 and the ROM 420 also can be included as a portion of the microprocessor 406. It will be further appreciated that other types of memory, e.g., electrically erasable programmable read-only memory (EEPROM) or flash memory can be utilized as well for the pager RAM 418.

The ROM 420 includes firmware elements utilized by the microprocessor 406 for controlling the acknowledge-back pager 400 in accordance with the preferred embodiment of the present invention. The firmware elements comprise a retrieval command detector 424 for detecting a predetermined retrieval command sent from the fixed portion 100 in response to accepting a selective call origination from the user, the selective call origination comprising a predetermined retrieval code associated with the acknowledge-back pager 400. Preferably, there are at least two different predetermined retrieval commands corresponding to at least two different predetermined retrieval codes enterable by the selective call origination. Depending upon the specific predetermined retrieval command received, the acknowledge-back pager 400 will retransmit to the fixed portion either all the messages stored in the pager RAM 418, or only the messages that are indicated by the read/unread flag 421 as being unread. Preferably, the predetermined retrieval code can be generated from a conventional tone-dial telephone, i.e., the predetermined retrieval code preferably consists of a combination of "#", "*", and the digits 0 through 9.

The firmware elements further comprise a message retriever 426 for retrieving the message from the pager RAM 418 in response to the predetermined retrieval command. In addition, the firmware elements include an undo code sender 428 for controlling the transmitter 412 to send a predetermined undo code in a radio transmission from the acknowledge-back pager to the fixed portion 100. The firmware elements also include a control interface 430 for activating the undo code sender 428 to send the predetermined undo code in response to a predetermined user control sequence. It will be appreciated that, alternatively, the firmware elements can include a retrieval mode originator (not shown) for sending a predetermined code from the acknowledge-back pager 400 to the fixed portion 100. In response, future messages intended for the acknowledge-back pager 400 would be stored in the fixed portion 100 until receipt of the predetermined undo code.

Figure 5:
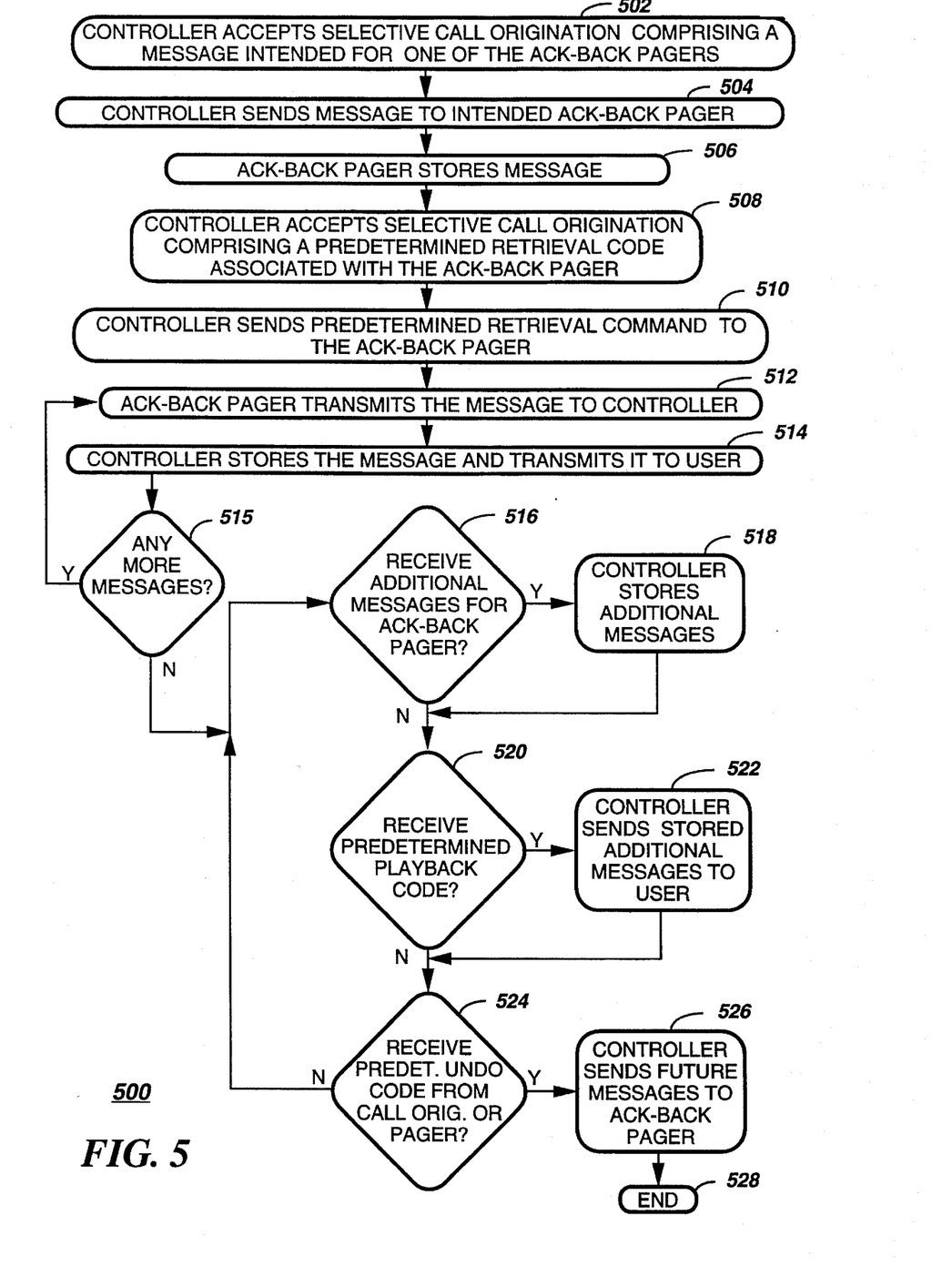
FIG. 5 is a flow chart depicting operation of the selective call communication system in accordance with the first and second embodiments of the present invention.

With reference to FIG. 5, a flow chart 500 depicting operation of the selective call communication system in accordance with the first and second embodiments of the present invention begins with the controller 201, 601 accepting 502 a selective call origination through the telephone system 116. The selective call origination comprises a message intended for, i.e., addressed to, one of the acknowledge-back pagers 400, 700. In response, the controller 201, 601 controls the transmitter 202 to send 504 the message to the acknowledge-back pager 400, 700 in a manner well known to one of ordinary skill in the art. The acknowledge-back pager 400, 700 then receives and stores 506 the message in the pager RAM 418.

Later, the controller 201, 601 accepts 508 a selective call origination from a user, comprising a predetermined retrieval code associated with the acknowledge-back pager 400, 700. Preferably, the predetermined retrieval code is derived algorithmically from the selective call address of the acknowledge-back pager 400, 700, so that each of the acknowledge-back pagers 400, 700 has a unique predetermined retrieval code to prevent unauthorized access to the retrieval process. It will be appreciated that, alternatively, at the cost of additional memory, the controller 201, 601 can be pre-programmed with a database of user-determined retrieval codes to make each user's predetermined retrieval code easier for the user to remember. Preferably, the predetermined retrieval code is entered in a manner similar to entering other numeric messages to be sent to the acknowledge-back pager 400.

In response to the predetermined retrieval code, the controller 201, 601 sends 510 a predetermined retrieval command to the acknowledge-back pager 400, 700. In response, if there is a message stored in the pager RAM 418 that is in accordance with the specific predetermined retrieval command received (e.g., send unread, or send all), then the acknowledge-back pager 400, 700 retrieves the message from the pager RAM 418 and utilizes the transmitter 412 to transmit 512 the message to the controller 201, 601. For the case of a numeric or alphanumeric message, the controller 201 then stores 514 the message in the controller RAM 232, along with the pager ID 302. For the case of a voice message, the controller 601 (FIG. 6) stores 514 the message and the pager ID in a conventional voice mail system 602 (FIG. 6) forming a portion of the controller 601.

Next, the microprocessor 406 of the acknowledge-back pager 400, 700 checks 515 whether there is another message stored in the pager that is in accordance with the specific predetermined retrieval command received. If so, the flow returns to step 512 to retrieve and transmit the message to the controller 201, 601. If not, the flow proceeds to step 516 at which the controller 201, 601 waits for additional messages for the acknowledge-back pager 400, 700. If additional messages are received before a predetermined undo code is received, the controller 201, 601 stores 518 the additional messages in the controller RAM 232 (or for a voice paging system, in the voice mail system 602).

If no additional messages are received, the controller 201, 601 checks 520 whether the predetermined playback code has been received. If so, the controller 201, 601 sends 522 to the user via the telephone system 116 any additional messages stored for the acknowledge-back pager 400, 700 in step 518. Then the flow moves to step 524. Preferably, for ease of use, the predetermined playback code is selected to be identical to the predetermined retrieval code. It will be appreciated that, alternatively, the two types of codes can be different if required for operational reasons.

If, on the other hand, no predetermined playback code has been received, the flow moves directly to step 524 to check whether the predetermined undo code has been received in either a selective call origination from the telephone system 116, or in a message transmitted by the acknowledge-back pager 400, 700. If not, the flow returns to step 516 to check for additional messages.

If, on the other hand, the predetermined undo code has been received, flow moves to step 526, in which the controller 201, 601 reverts to a pre-retrieval status of sending all future messages received for the acknowledge-back pager 400, 700 to the acknowledge-back pager 400, 700 for storage therein, instead of storing the messages in the controller 201, 601. Thereafter, the retrieval process ends 528. It will be appreciated that, alternatively, the controller 201, 601 can also transmit any unread (or all) messages stored in the controller RAM 232 and intended for the acknowledge-back pager 400, 700 to the acknowledge-back pager 400, 700, in response to the predetermined undo code.

Figure 6:
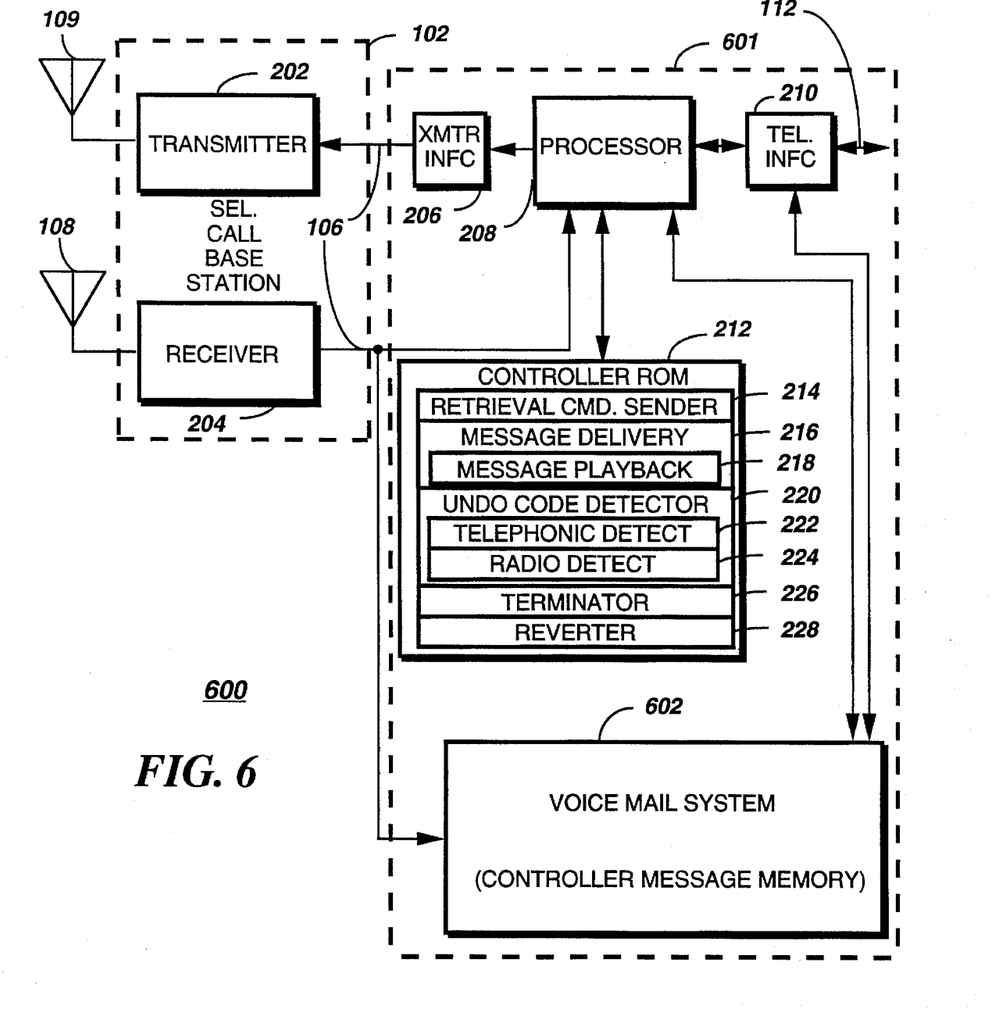
FIG. 6 is an electrical block diagram of portions of a controller and a selective call base station in accordance with the second embodiment of the present invention.

With reference to FIG. 6, an electrical block diagram depicts portions 600 of the controller 601 and the selective call base station 102 in accordance with the second embodiment of the present invention. The second embodiment is intended for use in voice paging systems. The controller 601 is similar to the controller 201, the essential difference being that the controller RAM 232 and the text-to-speech converter 230 of the controller 201 have been eliminated, and a conventional voice mail system 602 has been added as the controller memory for storage of messages. Preferably, the voice mail system 602 operates under the control of the processor 208, and can receive a voice message from the acknowledge-back pager 700 (FIG. 7) via the receiver 204, as well as from the telephone system 116 via the telephone interface 210. Messages retrieved by the user preferably are played back to the telephone system 116 through the telephone interface 210.

Also preferably, the voice mail system 602 is similar to the Digital Sound 2000™ voice mail system manufactured by Digital Sound Corporation of Carpinteria, Calif. It will be appreciated that other similar voice mail systems can be utilized for the voice mail system 602. It will be further appreciated that, alternatively, the voice mail system 602 can be provided with a telephone access port independent of the telephone interface 210 for retrieval of a stored message directly from the voice mail system 602.

Figure 7:
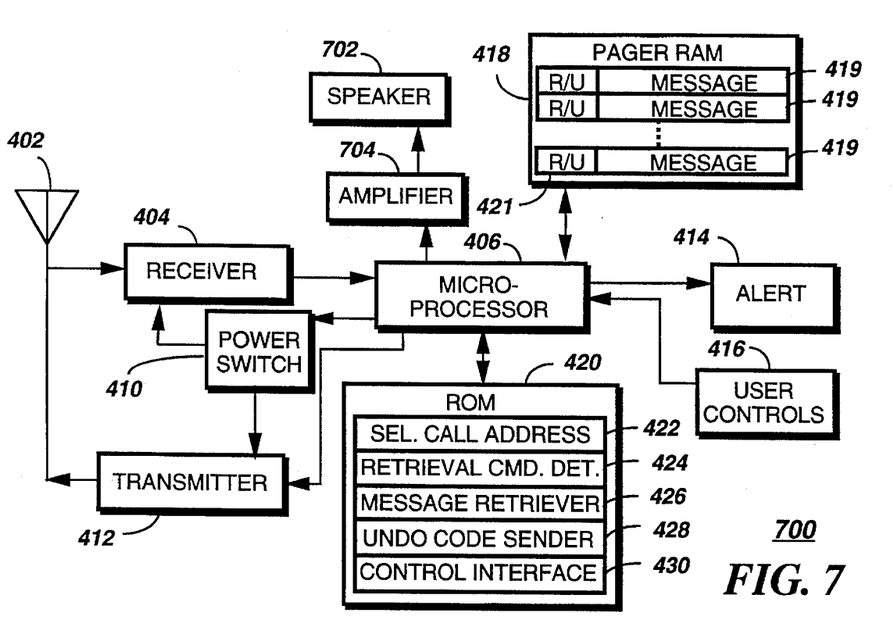
FIG. 7 is an electrical block diagram of an acknowledge-back pager of the selective call communication system in accordance with the second embodiment of the present invention.

With reference to FIG. 7, an electrical block diagram depicts the acknowledge-back pager 700 of the selective call communication system in accordance with the second embodiment of the present invention. The acknowledge-back pager 700 is similar to the acknowledge-back pager 400, the essential difference being that the display 408 of the acknowledge-back pager 400 has been replaced by a conventional speaker 702 and a conventional audio amplifier 704 coupled to the microprocessor 406 for providing voice message reproduction. Conventional analog-to-digital and digital-to-analog converters (not shown) are available in the microprocessor 406 for storage and retrieval, respectively, of a voice message in the acknowledge-back pager 700.

Figure 8:
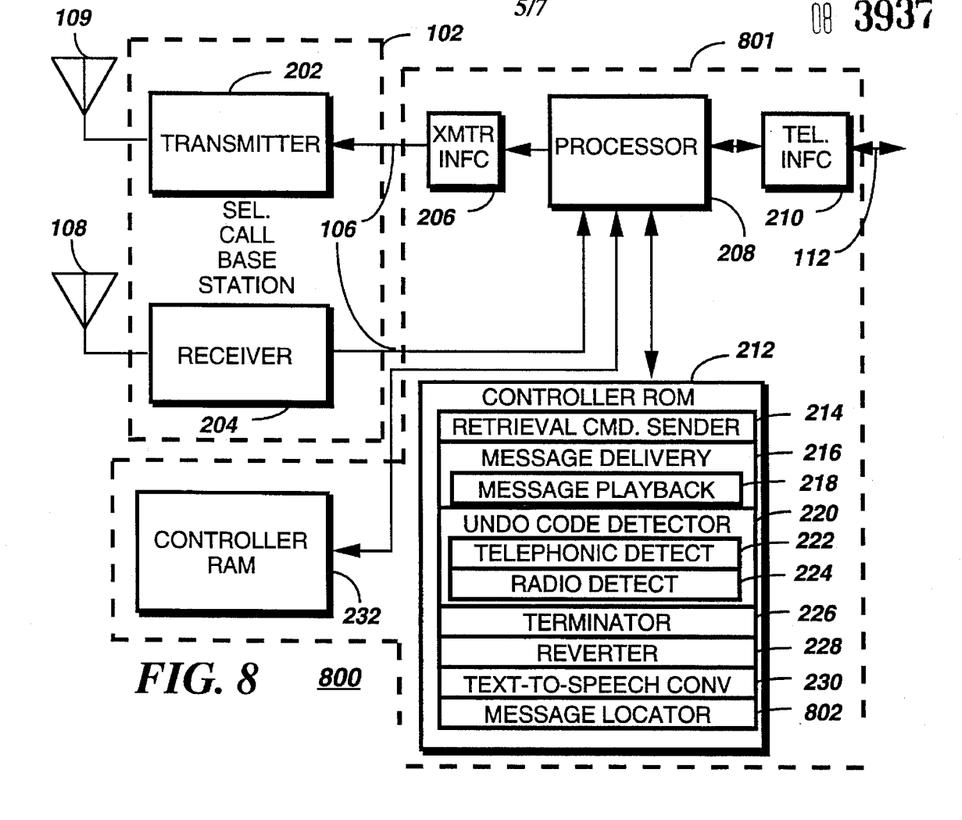
FIG. 8 is an electrical block diagram of portions of a controller and a selective call base station in accordance with the third embodiment of the present invention.

With reference to FIG. 8, an electrical block diagram depicts portions of the controller 801 and the selective call base station 102 in accordance with the third embodiment of the present invention. Like the first embodiment, the third embodiment is intended for use in numeric and alphanumeric paging systems. The controller 801 is similar to the controller 201, the essential difference being a reconfiguration of the controller RAM 232, as described below in reference to FIG. 9, and the addition of a message locator 802 in the controller ROM 212. The message locator 802 is for accessing the controller RAM 232 to locate a stored message by matching a message identifier received by the receiver 204 with a message identifier stored in the controller RAM, as is explained in more detail below.

Figure 9:
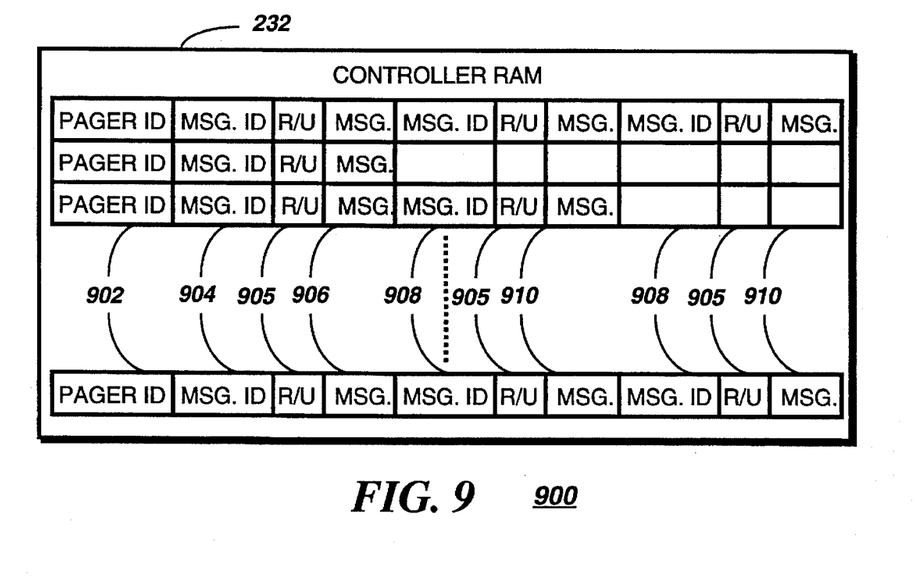
FIG. 9 is a memory utilization diagram of a controller RAM in accordance with the third embodiment of the present invention.

With reference to FIG. 9, a memory utilization diagram 900 of the controller RAM 232 in accordance with the third embodiment of the present invention depicts at least one pager ID 902 associated with storage locations each comprising a message ID 904 and a corresponding message storage location 906. The storage locations each further comprise additional message IDs 908 and corresponding additional message storage locations 910. Also included in the controller RAM 232 is a read/unread flag 905 corresponding to each message storage location 906, 910 for indicating whether or not the user has read (or played back) the message stored therein. Preferably, the message IDs 904, 908 associated with each pager ID 902 are generated by the processor 208 in a predetermined manner, e.g., by incrementing a count corresponding to each acknowledge-back pager 1000 as each message intended therefor is stored. The message IDs 904, 908 thus uniquely identify the messages stored in the message storage locations 906, 910. Also preferably, the messages and corresponding message IDs associated with each of the pager IDs 902 are stored as a conventional linked list, so that a variable number of messages can be stored as required for each of the pager IDs 902, limited by the total capacity of the controller RAM 232.

Figure 10:
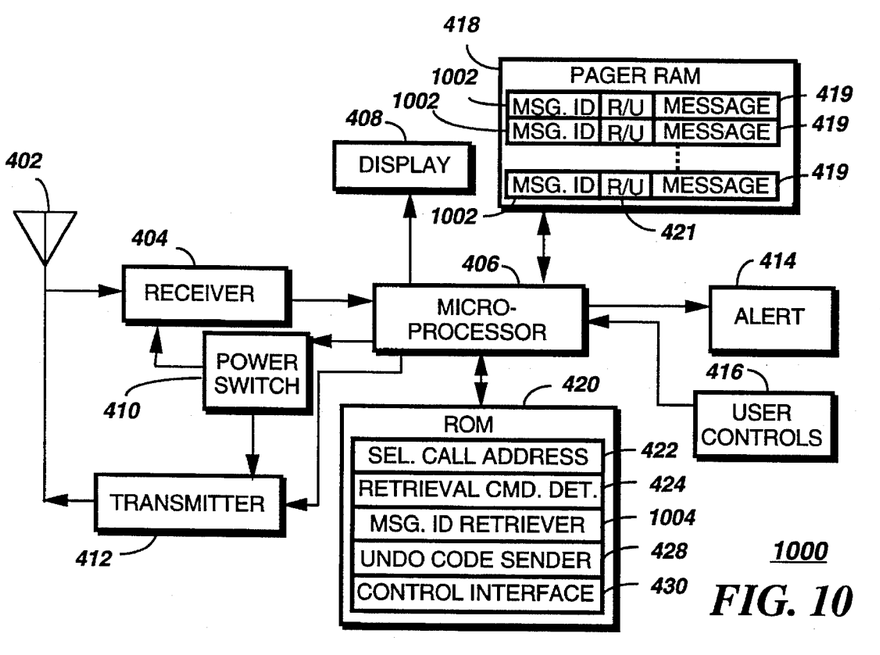
FIG. 10 is an electrical block diagram of an acknowledge-back pager of the selective call communication system in accordance with the third embodiment of the present invention.

With reference to FIG. 10, an electrical block diagram depicts the acknowledge-back pager 1000 of the selective call communication system in accordance with the third embodiment of the present invention. The acknowledge-back pager 1000 is similar to the acknowledge-back pager 400, the essential difference being that the message retriever 426 has been replaced by a message ID retriever 1004. In addition, a message ID location 1002 corresponding to each message location 419 has been added. The message ID retriever 1004 is for retrieving message identifiers from the message ID locations 1002 of the pager RAM 418 in response to, and in accordance with, the predetermined retrieval command. Preferably, the message identifiers are transmitted to the acknowledge-back pager 1000, along with the messages.

Figure 11:
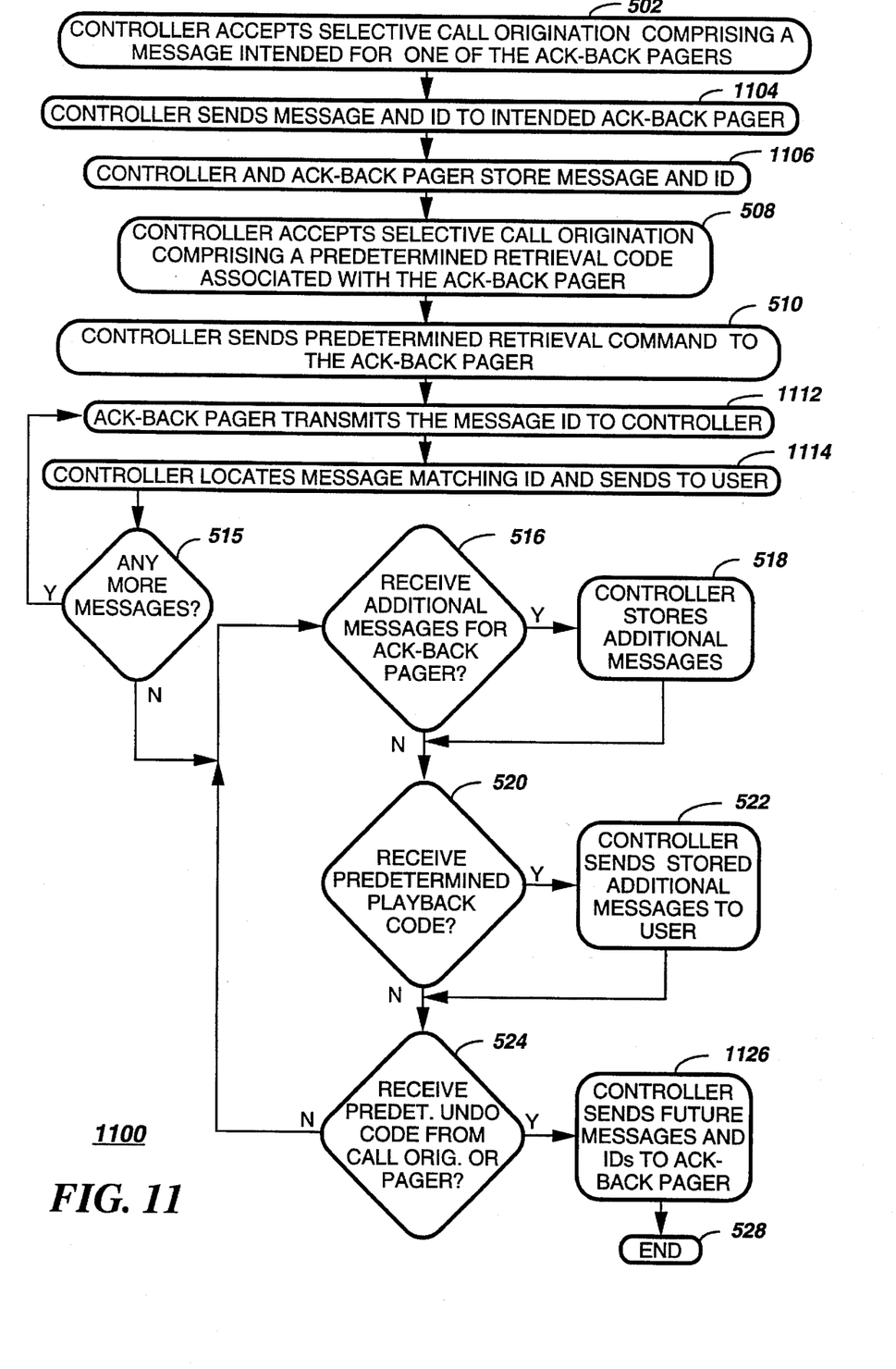
FIG. 11 is a flow chart depicting operation of the selective call communication system in accordance with the third embodiment of the present invention.

With reference to FIG. 11, a flow chart 1100 depicting operation of the selective call communication system in accordance with the third embodiment of the present invention is similar to the flow chart 500, the essential differences being the replacement of steps 504, 506, 512, 514, and 526 by steps 1104, 1106, 1112, 1114, and 1126, respectively. In addition, all the steps of the flow chart 1100 apply to the controller 801 and the acknowledge-back pager 1000, in accordance with the third embodiment, instead of to the controller 201, 601 and the acknowledge-back pager 400, 700. In step 1104, the controller 801 sends both a message and a corresponding message ID to the acknowledge-back pager 1000. In step 1106, both the controller 801 and the acknowledge-back pager 1000 store both the message and the corresponding message ID in the controller RAM 232 and the pager RAM 418, respectively. In step 1112, the acknowledge-back pager 1000 transmits the message ID to the controller 801 so that in step 1114 the controller 801 can locate the message corresponding to the message ID by matching the message ID transmitted from the acknowledge-back pager 1000 with the message IDs and messages stored in the controller RAM 232. In step 1126, the controller 801 reverts to a pre-retrieval status of sending all future messages received for the acknowledge-back pager 1000, along with corresponding message IDs, to the acknowledge-back pager 1000 for storage therein, in addition to storing the messages and corresponding message IDs in the controller 801.

An advantage provided by the third embodiment in accordance with the present invention is a savings of reverse channel airtime. Saving reverse channel airtime can be important in a system operating near maximum capacity, because the reverse channel preferably operates at a much slower transmission rate than that of the forward channel (to save pager battery power). Sending the message IDs along with the messages on the forward channel does cost some additional forward channel airtime, as well as additional memory space in both the acknowledge-back pager 1000 and the controller 801, compared to the acknowledge-back pager 400 and the controller 201 but such costs can be more that offset by the savings in reverse channel airtime in a busy system.

Thus it should have become apparent that the present invention provides a method and apparatus for remotely retrieving messages intended for a pager, so that a remote pager user advantageously can maintain currency of message reception and further can prevent lost messages due to a full pager memory. Three embodiments in accordance with the present invention have been described to accommodate a range of system characteristics.

What is claimed is:

1. A method for remotely retrieving messages intended for an acknowledge-back pager in a selective call communication system including a fixed portion and a portable portion comprising the acknowledge-back pager, the selective call communication system having provisions for interconnection with a user through a telephone system, the method comprising the steps of:

accepting by the fixed portion a selective call origination from a caller, comprising a message intended for the acknowledge-back pager;

sending the message from the fixed portion to the acknowledge-back pager in response;

storing the message sent in the sending step within a pager memory of the acknowledge-back pager;

thereafter accepting by the fixed portion a selective call origination from the user, the selective call origination comprising a predetermined retrieval code associated with the acknowledge-back pager;

sending a predetermined retrieval command to the acknowledge-back pager in response;

retrieving the message from the pager memory in response to the predetermined retrieval command;

transmitting the message retrieved, from the acknowledge-back pager to the fixed portion;

storing the message transmitted in the transmitting step within a controller memory of the fixed portion; and thereafter sending the message from the controller memory through the telephone system to the user.

2. The method of claim 1, further comprising the step of storing, in the controller memory, additional messages intended for the acknowledge-back pager, in response to having received the predetermined retrieval code without having later received a predetermined undo code intended for the acknowledge-back pager, and further in response to accepting additional selective call originations comprising the additional messages intended for the acknowledge-back pager.

3. The method of claim 2, further comprising the step of sending the additional messages from the controller memory to the user in response to accepting another selective call origination from the user, comprising a predetermined playback code intended for the acknowledge-back pager.

4. The method of claim 2, further comprising the steps of:

receiving the predetermined undo code intended for the acknowledge-back pager after having received the predetermined retrieval code;

terminating the step of storing the additional messages in the controller memory, in response to the receiving step;

thereafter sending future messages from the fixed portion to the acknowledge-back pager; and storing the future messages in the pager memory.

5. A method for remotely retrieving messages intended for an acknowledge-back pager in a selective call communication system including a fixed portion and a portable portion comprising the acknowledge-back pager, the selective call communication system having provisions for interconnection with a user through a telephone system, the method comprising the steps of:

accepting by the fixed portion a selective call origination from a caller, comprising a message intended for the acknowledge-back pager;

sending the message and a corresponding message identifier from the fixed portion to the acknowledge-back pager in response;

storing the message and the message identifier sent in the sending step within a pager memory of the acknowledge-back pager and within a controller memory of the fixed portion;

thereafter accepting by the fixed portion a selective call origination from the user, the selective call origination comprising a predetermined retrieval code associated with the acknowledge-back pager;

sending a predetermined retrieval command to the acknowledge-back pager in response;

retrieving the message identifier from the pager memory in response to the predetermined retrieval command;

transmitting the message identifier retrieved, from the acknowledge-back pager to the fixed portion;

accessing the controller memory to locate the message by matching the message identifier transmitted in the transmitting step with the message identifier stored in the controller memory; and thereafter sending the message from the controller memory through the telephone system to the user.

6. The method of claim 5, further comprising the step of storing, in the controller memory, additional messages intended for the acknowledge-back pager, in response to having received the predetermined retrieval code without having later received a predetermined undo code intended for the acknowledge-back pager, and further in response to accepting additional selective call originations comprising the additional messages intended for the acknowledge-back pager.

7. The method of claim 6, further comprising the step of sending the additional messages from the controller memory to the user in response to accepting another selective call origination from the user, comprising a predetermined playback code intended for the acknowledge-back pager.

8. The method of claim 6, further comprising the steps of:

receiving the predetermined undo code intended for the acknowledge-back pager after having received the predetermined retrieval code;

terminating the step of storing the additional messages in the controller memory, in response to the receiving step;

thereafter sending future messages and corresponding future message identifiers from the fixed portion to the acknowledge-back pager; and storing the future messages and the corresponding future message identifiers in the pager memory and in the controller memory.

9. A controller for providing remote retrieval of messages intended for an acknowledge-back pager in a selective call communication system including a fixed portion comprising the controller and a transmitter, and a portable portion comprising the acknowledge-back pager, the controller having provisions for interconnection with a user through a telephone system, the controller comprising:

a telephone interface coupled to the telephone system for accepting a selective call origination from a caller, comprising a message intended for the acknowledge-back pager;

a processor coupled to the telephone interface for processing the selective call origination;

a transmitter interface coupled to the processor for controlling the transmitter to send the message to the acknowledge-back pager for storage in a pager memory therein;

a retrieval command sender coupled to the processor for controlling the transmitter to send a predetermined retrieval command to the acknowledge-back pager in response to accepting a selective call origination from the user, the selective call origination comprising a predetermined retrieval code associated with the acknowledge-back pager;

a receiver coupled to the processor for receiving a transmission of the message, the message retrieved from the pager memory in response to the predetermined retrieval command;

a controller memory for storing the message received from the pager memory; and a message delivery element coupled to the processor for transmitting the message from the controller through the telephone system to the user.

10. The controller of claim 9, wherein the controller memory comprises additional message storage for storing additional messages intended for the acknowledge-back pager, in response to having received the predetermined retrieval code without having later received a predetermined undo code intended for the acknowledge-back pager, and further in response to accepting additional selective call originations comprising the additional messages intended for the acknowledge-back pager.

11. The controller of claim 10, wherein the message delivery element comprises a message playback element for sending the additional messages from the controller memory to the user in response to accepting another selective call origination from the user, comprising a predetermined playback code intended for the acknowledge-back pager.

12. The controller of claim 10, further comprising:

an undo code detector coupled to the processor for detecting a reception of the predetermined undo code intended for the acknowledge-back pager after having received the predetermined retrieval code;

a terminator coupled to the undo code detector for terminating storage of the additional messages in the controller memory, in response to the undo code detector detecting the reception of the predetermined undo code; and a reverter coupled to the undo code detector for sending future messages to the acknowledge-back pager for storage therein in response to the undo code detector detecting the reception of the predetermined undo code.

13. A controller for providing remote retrieval of messages intended for an acknowledge-back pager in a selective call communication system including a fixed portion comprising the controller and a transmitter, and a portable portion comprising the acknowledge-back pager, the controller having provisions for interconnection with a user through a telephone system, the controller comprising:

a telephone interface coupled to the telephone system for accepting a selective call origination from a caller, comprising a message intended for the acknowledge-back pager;

a processor coupled to the telephone interface for processing the selective call origination and for storing the message and a corresponding message identifier in a controller memory;

the controller memory coupled to the processor for storing the message and the message identifier;

a transmitter interface coupled to the processor for controlling the transmitter to send the message and the message identifier to the acknowledge-back pager for storage in a pager memory therein;

a retrieval command sender coupled to the processor for controlling the transmitter to send a predetermined retrieval command to the acknowledge-back pager in response to accepting a selective call origination from the user, the selective call origination comprising a predetermined retrieval code associated with the acknowledge-back pager;

a receiver coupled to the processor for receiving a transmission of the message identifier, the message identifier retrieved from the pager memory in response to the predetermined retrieval command;

a message locator for accessing the controller memory to locate the message by matching the message identifier received by the receiver with the message identifier stored in the controller memory; and a message delivery element coupled to the processor for sending the message from the controller memory through the telephone system to the user.

14. The controller of claim 13, wherein the controller memory comprises additional message storage for storing additional messages intended for the acknowledge-back pager, in response to having received the predetermined retrieval code without having later received a predetermined undo code intended for the acknowledge-back pager, and further in response to accepting additional selective call originations comprising the additional messages intended for the acknowledge-back pager.

15. The controller of claim 14, wherein the message delivery element comprises a message playback element for sending the additional messages from the controller memory to the user in response to accepting another selective call origination from the user, comprising a predetermined playback code intended for the acknowledge-back pager.

16. The controller of claim 14, further comprising:

an undo code detector coupled to the processor for detecting a reception of the predetermined undo code intended for the acknowledge-back pager after having received the predetermined retrieval code;

a terminator coupled to the undo code detector for terminating storage of the additional messages in the controller memory, in response to the undo code detector detecting the reception of the predetermined undo code; and a reverter coupled to the undo code detector for sending future messages and corresponding future message identifiers to the acknowledge-back pager for storage therein, and further for storing the future messages and corresponding future message identifiers in the controller memory, in response to the undo code detector detecting the reception of the predetermined undo code.

17. An acknowledge-back pager for providing remote retrieval of messages intended for the acknowledge-back pager in a selective call communication system including a fixed portion and a portable portion comprising the acknowledge-back pager, the selective call communication system having provisions for interconnection with a user through a telephone system, the acknowledge-back pager comprising:

a receiver communicating by radio with the fixed portion for receiving a message therefrom in response to a selective call origination from a caller, comprising the message intended for the acknowledge-back pager;

a pager memory coupled to the receiver for storing the message in the acknowledge-back pager;

a microprocessor coupled to the receiver and coupled to the pager memory for controlling the acknowledge-back pager;

user controls coupled to the microprocessor for providing operational control of the acknowledge-back pager;

a retrieval command detector coupled to the microprocessor for detecting a predetermined retrieval command sent from the fixed portion in response to accepting a selective call origination from the user, the selective call origination comprising a predetermined retrieval code associated with the acknowledge-back pager;

a message retriever coupled to the microprocessor for retrieving the message from the pager memory in response to the predetermined retrieval command; and a transmitter coupled to the message retriever for transmitting the message retrieved, from the acknowledge-back pager to the fixed portion, in further response to the predetermined retrieval command.

18. The acknowledge-back pager of claim 17, further comprising an undo code sender coupled to the microprocessor for controlling the transmitter to send a predetermined undo code in a radio transmission from the acknowledge-back pager to the fixed portion.

19. The acknowledge-back pager of claim 18, further comprising a control interface coupled to the microprocessor for activating the undo code sender to send the predetermined undo code in response to a predetermined user control sequence.

20. An acknowledge-back pager for providing remote retrieval of messages intended for the acknowledge-back pager in a selective call communication system including a fixed portion and a portable portion comprising the acknowledge-back pager, the selective call communication system having provisions for interconnection with a user through a telephone system, the acknowledge-back pager comprising:

a receiver communicating by radio with the fixed portion for receiving a message and a corresponding message identifier therefrom in response to a selective call origination from a caller, comprising the message intended for the acknowledge-back pager;

a pager memory coupled to the receiver for storing the message and the message identifier in the acknowledge-back pager;

a microprocessor coupled to the receiver and coupled to the pager memory for controlling the acknowledge-back pager;

user controls coupled to the microprocessor for providing operational control of the acknowledge-back pager;

a retrieval command detector coupled to the microprocessor for detecting a predetermined retrieval command sent from the fixed portion in response to accepting a selective call origination from the user, the selective call origination comprising a predetermined retrieval code associated with the acknowledge-back pager;

a message identifier retriever coupled to the microprocessor for retrieving the message identifier from the pager memory in response to the predetermined retrieval command; and a transmitter coupled to the message identifier retriever for transmitting the message identifier retrieved, from the acknowledge-back pager to the fixed portion, in further response to the predetermined retrieval command.

21. The acknowledge-back pager of claim 20, further comprising an undo code sender coupled to the microprocessor for controlling the transmitter to send a predetermined undo code in a radio transmission from the acknowledge-back pager to the fixed portion.

22. The acknowledge-back pager of claim 21, further comprising a control interface coupled to the microprocessor for activating the undo code sender to send the predetermined undo code in response to a predetermined user control sequence.

* * * * *